United States Patent
Yang et al.

(10) Patent No.: US 7,516,572 B2
(45) Date of Patent: Apr. 14, 2009

(54) METHOD OF PREVENTING AND CONTROLLING INSECT PESTS

(75) Inventors: En-Cheng Yang, No. 27, Lane 113, Sec. 4, Roosevelt Rd., Taipei City (TW); Wen-Yen Wu, Taipei (TW); Yu-Po Chen, Taipei (TW)

(73) Assignee: En-Cheng Yang, Taipei (TW)

( * ) Notice: Subject to any disclaimer, the term of this patent is extended or adjusted under 35 U.S.C. 154(b) by 201 days.

(21) Appl. No.: 11/606,879

(22) Filed: Dec. 1, 2006

(65) Prior Publication Data

US 2008/0127545 A1    Jun. 5, 2008

(51) Int. Cl.
*A01M 1/14* (2006.01)

(52) U.S. Cl. ............... 43/114; 43/107; 43/132.1

(58) Field of Classification Search ........... 382/117, 382/110, 159, 160; 43/107, 114, 132.1
See application file for complete search history.

(56) References Cited

U.S. PATENT DOCUMENTS

| | | | |
|---|---|---|---|
| 6,229,905 B1 * | 5/2001 | Suzaki | 382/110 |
| 2003/0142852 A1 * | 7/2003 | Lu et al. | 382/110 |
| 2007/0127781 A1 * | 6/2007 | Stewart | 382/110 |
| 2008/0101657 A1 * | 5/2008 | Durkin et al. | 382/110 |
| 2008/0134568 A1 * | 6/2008 | Cowan et al. | 43/113 |
| 2008/0192990 A1 * | 8/2008 | Kozakaya | 382/117 |

\* cited by examiner

*Primary Examiner*—Kurt Rowan
(74) *Attorney, Agent, or Firm*—Rosenberg, Klein & Lee

(57) ABSTRACT

A method for preventing and controlling insect pests is provided. First, the spectral sensitivities of photoreceptors in the compound eye of the insects were measured intracellularly by equal quantum flux measurements; the measured signals were preamplified and then sent to a PC-based data acquisition system. Next, the colored papers were chosen according to the spectral sensitivities of the photoreceptors to test the color preference of the insect, and the data was analyzed with the ANOVA test. A linear model was used to analyze the choice rate data obtained from the color preference tests. Finally, the spectra of the colors, which preference of the insect were obtained to further developing a visual cue trap.

20 Claims, 5 Drawing Sheets

| Models | $x^2$ value / $DF$ | $x_D$ | $x_U$ | $x_V$ | $x_G$ | $x_R$ |
|---|---|---|---|---|---|---|
| DUVGR | 1.7031 | -5.5209 | 10.1939 | -3.9723 | -0.468 | 6.4956 |
| DUVG | 1.7612 | -0.225 | 28.3583 | -31.3145 | 9.5585 | |
| DUVR | 1.6973 | -6.0287 | 9.6471 | -3.5251 | | 6.4187 |
| DUGR | 1.6964 | -7.6333 | 6.6702 | | 0.1701 | 6.7859 |
| DVGR | 1.6971 | -11.8594 | | 7.1525 | 1.9888 | 7.1027 |
| UVGR | 1.6998 | | 18.1487 | -12.3335 | -3.3433 | 6.2837 |
| DGR | 1.7351 | -16.3554 | | | 13.9506 | 2.5691 |
| VGR | 1.7526 | | | 13.7924 | -17.8471 | 12.5544 |
| DVR | 1.69 | -10.8664 | 8.0356 | 7.7499 | | |
| DVG | 1.7782 | -19.7718 | | -2.6797 | 20.9056 | |
| UGR | 1.6995 | | 10.4953 | | -10.7216 | 9.629 |
| DUR | 1.6903 | -7.5174 | 6.7346 | | | 6.833 |
| DUG | 1.7824 | -21.584 | -2.4735 | | 21.911 | |
| UVR | 1.7009 | | 21.1761 | -17.613 | | 4.7012 |
| UVG | 1.755 | | 28.6675 | -31.6283 | 9.4238 | |
| DUV | 1.7678 | 15.3671 | 49.1484 | -52.3448 | | |
| UV | 2.3344 | | | | | |
| UD | 2.3442 | | | | | |
| UG | 2.3336 | | | | | |
| UR | 2.644 | | | | | |
| VD | 2.2949 | | | | | |
| VG | 2.1968 | | | | | |
| VR | 2.0775 | | | | | |
| DG | 1.8051 | -21.353 | | | 21.1425 | |
| DR | 1.8469 | -4.438 | | | | 4.9707 |
| GR | 1.9447 | | | | -4.6525 | 5.2333 |
| D | 2.3401 | | | | | |
| U | 2.3339 | | | | | |
| V | 2.3296 | | | | | |
| G | 2.3473 | | | | | |
| R | 2.3669 | | | | | |

Figure 6

METHOD OF PREVENTING AND CONTROLLING INSECT PESTS

BACKGROUND

1. Field of Invention

The present invention relates to a method of preventing and controlling insect pests. More particularly, the present invention relates to a method of preventing and controlling insect pests based on a physiological perception to develop a visual cue trap.

2. Description of Related Art

Color traps are convenient tools for monitoring and controlling pests. Hundreds of application studies have been published to discuss the effects of the color traps for various pests. However the definitions of the applied colors are often based on the human perception, which maybe confused with different spectra.

The oriental fruit fly, *Bactrocera dorsalis*, for example, is the main fruit fly pest in the Pacific Rim, and numerous lure-and-kill traps with yellow colored surfaces have been developed and applied in the field, such as yellow sticky papers and methyleugenol-baited traps.

Although the "yellow traps" are applied to control this pest, the crucial attractive cues have still not been fully investigated. In fact, using a color name as a reference to describe a fly's preference is not correct, since the human color vision is quite different from insects. Thus, the developed insect traps have serious functional deficiencies. Moreover, the "negative attractive cues" may touch off and lead to loses in the efficacy of these traps.

To achieve the purpose of developing a more effectively chromatic cue trap, there is a need to understand the chromatic cues of insects with a physiological perspective to describe and define the visual preference behavior precisely.

SUMMARY

The present invention is directed to a method of preventing and controlling insect pests that satisfies the need to develop a more effective chromatic cue trap from a physiological perspective.

It is therefore an aspect of the present invention to provide a method of preventing and controlling insect pests, which combine manipulations of a spectral sensitivity measurement, color preference test, and linear modeling analysis to develop the more effective chromatic cue traps.

It is another aspect of the present invention to provide a method of preventing and controlling insect pests to interpret the correlation between the spectral cues and the actual color preference behavior of insects.

In accordance with the foregoing and other objectives of the present invention, a method of preventing and controlling insect pests was provided. The manipulation of the method of preventing and controlling insect pests comprises the following steps: first, measuring the spectral sensitivities of the photoreceptors in the compound eye of the insects, and then grouping the spectral types of photoreceptors by recording and analyzing the peak wavelengths.

Next, measuring the reflectance spectra of colored papers, and selecting applicable colored papers to test the color preference of the insects. Then, the visual stimulus provided by the colored papers is calculated for each type of photoreceptor by quantum catch theory.

Afterward, applying a generalized linear model to analyze the data, and referring to the inference of the above tests to further develop the chromatic cue traps.

According to the embodiments of the present invention, the spectral sensitivity is carried out by an equal quantum flux measurement, and then the measured signals were preamplified and inputted to a data acquisition system. After the data processing and analyzing, the photoreceptors of the compound eye were grouped together based on their spectral sensitivities. The reflectance spectra of the colored papers were measured by a spectrometer.

The color preference behavior test was performed based on the previously mentioned photoreceptor groups and the spectral reflectance measurement of the colored papers. The applicable colored papers that have reflectance spectrums satisfied by the photoreceptors groups were chosen to test the color preference of insects.

In embodiments of present invention, yellow, orange and red papers were chosen to test the effect of different stimuli on the sensitivity peaks between 490 nm~560 nm. The green and white papers were chosen to test the effect of both strong and zero UV stimulus. The choice rates made by insects were calculated, and the visual stimulus of each type of photoreceptor of the colored papers was also calculated to interpret the correlation between the spectral cues and attractiveness of insects.

The generalized linear model was applied to analyze the choice rate data obtained from the color preference tests. In embodiments of present invention, the stimuli of 370 and/or 510 nm photoreceptors had positive effects for attracting the fly, whereas the stimuli of 380 and/or 490 nm photoreceptors had a negative attraction effect. From this it was concluded that a color trap with a higher reflectance in UV and green-yellow range is more attractive to the oriental fruit fly, while a higher blue reflectance diminishes the attractiveness.

Referring to the inference of previous tests, the more effective chromatic cue traps were developed to prevent and control the insect pests. According to the embodiments of the present invention, the chromatic cue trap would be a colored article that with the reflectance spectrum preferred by the insects, such as a colored fruit-mimicking sphere, colored sticky paper, colored sticky board, and insect-catching lamp. In another embodiment of present invention, the chromatic cue trap cooperates with an olfactory cue.

As embodied and broadly described herein, the invention defines the chromatic preference of insects using the insect visible spectrum. The spectral sensitivities of the photoreceptors in the compound eyes of the insects were measured intracellularly, and the color preference of the insects was tested. The generalized linear model was applied to analyze the choice rate data obtained from the color preference tests. Thus, this invention not only evaluated the attractive effects of the colored papers, but also obtained the crucial cues to develop better color traps for insects.

It is to be understood that both the foregoing general description and the following detailed description are by examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

FIG. 6 is a table that shows the goodness-of-fit model of possible combinations (models) of the five types of photoreceptors;

DESCRIPTION OF THE PREFERRED EMBODIMENTS

Figure 1:
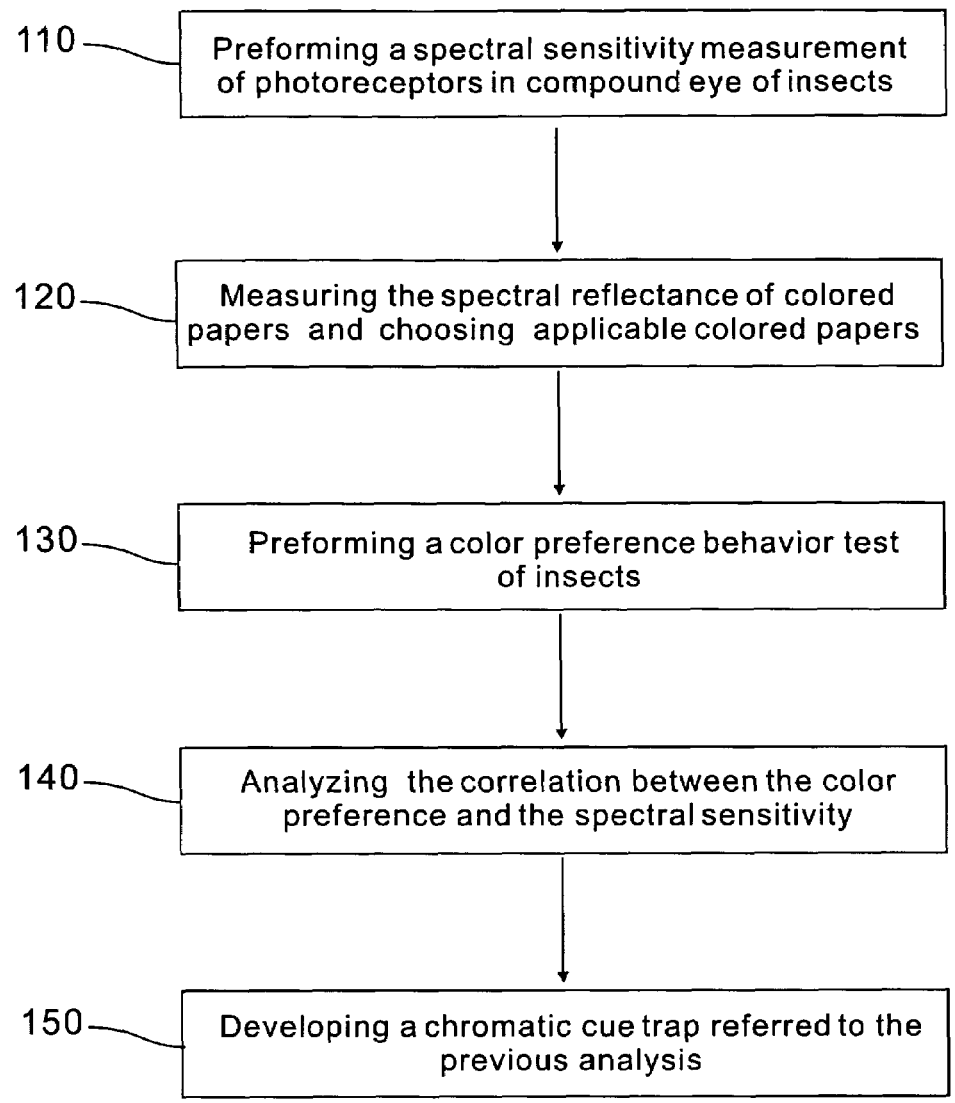
FIG. 1 is a flowchart of a method for controlling insect pests according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

Following embodiments are going to exemplify the oriental fruit fly (Bactrocera dorsaloshave) to detail explain the present invention.

Spectral Sensitivity Measurement

According to an embodiment of this invention, the theory of receptor quantum catch of insect's compound eye was used to investigate the crucial cues to attract the oriental fruit fly.

Reference is made to FIG. 1, which shows a flowchart of a method for controlling the insect pests according to the embodiment of the present invention. First, as shown in step 110, an equal quantum flux measurement is used to carry out the intracellular spectral sensitivity measurement of photoreceptors in the compound eye of the insect.

In order to provide an equal quantum flux stimulation for each measuring wavelength, a Xenon-short arc lamp (XBO 1000 W/HS/OFR, OSRAM) was used as the stimulating light source. Then, separated monochromatic lights with various wavelengths, which were separated from polychromatic white light with a monochromator (SP-150-M with 150-030-300 grating, Acton Research Co.) and passing a quartz circular variable neutral-density wedge filter (Acton Research Co.) to adjust the output quantum flux, were obtained. To output exact monochromatic light wavelengths a radiometer (System S370, UDT Instruments) is used to correct each measured wavelength in the beginning of the spectral sensitivity measurement.

Then, an optical instrument and a PC-based multifunction data acquisition system were used to record and analyze the respective electrophysiological responses from stimulated photoreceptors of the compound eye of the oriental fruit fly. According to the embodiment of present invention, the optical instruments and the multifunction data acquisition system are controlled by a program and executed on a compatible computer, such as a program developed by LabVIEW® software (ver 6i, National Instruments) on an IBM compatible PC.

A microelectrode was made of microfilament aluminosilicate capillary glass (O.D.=1.0 mm, I.D.=0.68 mm, AF100-68-10, Shutter Instrument Co.) and pulled on a Flaming-Brown microelectrode puller (P-97 Flaming/Brown Micropipette Puller, Shutter Instrument Co.), with a resistance of 140~160 MΩ when filled with 1 M lithium chloride, and the microelectrode was inserted though the window cut in the compound eye.

Using a micromanipulator (MWS-32, Narishige Scientific Instrument Lab.), the above-mentioned microelectrode was adjusted and lowered vertically to penetrate the photoreceptor. After inserting the microelectrode, the fly was dark-adapted for at least 10 minutes. The following manipulations were performed in the dark room to keep the fly dark-adapted. The signals measured by the microelectrode were preamplified by an amplifier (Neuropobe, Model 1600, A-M Systems Inc.) and then sent via a 12-bit multifunction data acquisition system (PCI-6024E, National Instruments) to an IBM compatible PC, and the amplified signals were converted into instantaneous data.

Figure 2:
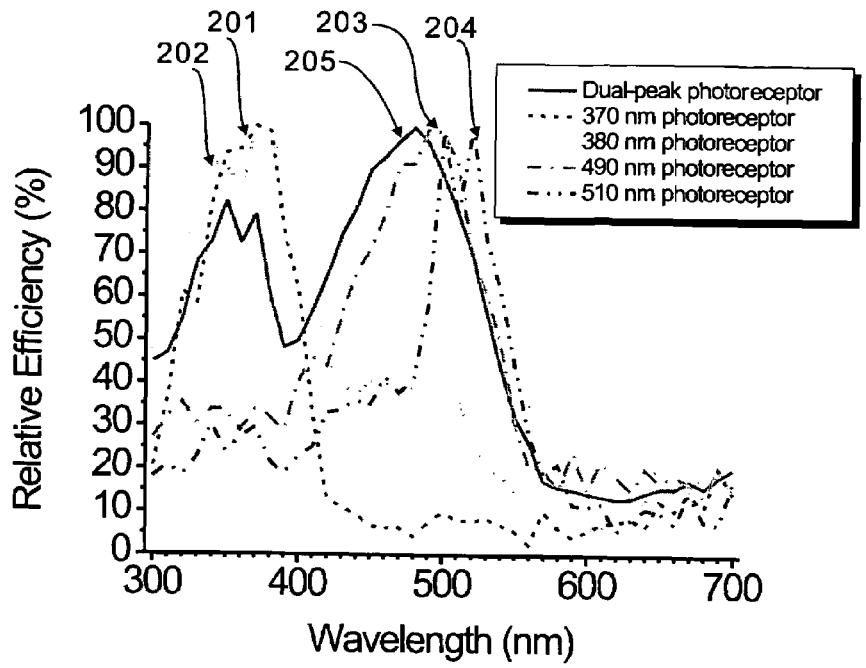
FIG. 2 is a diagram of the result of the spectral sensitivity measurement of insect's compound eye for various wavelengths.

Reference is made to FIG. 2, which shows a diagram of the result of the spectral sensitivity measurement for various wavelengths of the photoreceptors in the compound eye of the insect. Thirty-seven measurements were carried out by using the manipulations of step 110. The photoreceptors were measured from thirty-seven cells in the dorsal-frontal part of the left compound eye of the oriental fruit fly in dark adaptation. According to the $\lambda_{max}$ of the spectral sensitivity curve, these photoreceptor spectral types were grouped and termed as 370 nm, 380 nm, 490 nm, 510 nm and dual-peak photoreceptors. Wherein, the dual-peak photoreceptor's spectral sensitivity curves of cells were composed of two major peaks in the UV (330~370 nm) and the blue-green (430~510 nm) range.

Line 201 of FIG. 2 shows the sensitive range of the cells, which have photoreceptors belonged to the group of 370 nm photoreceptor, and is mainly located in the UV range of 300~400 nm. A nomogram-fitting procedure demonstrated that the curve was best fitted by the nomogram of the 370 nm visual pigments.

The line 202 of FIG. 2 shows the sensitive range of the cells, which have photoreceptors belonging to the 380 nm photoreceptor, displaying a similar spectrum distribution as the 370 nm photoreceptor in the UV range. Additionally, in addition a plateau shoulder between 440~520 nm with relative efficiency of 40% of the peak extends the sensitive range. The peak of the efficiency curve is located at 370 nm. However, due to the fact that the averaged curve is best fitted with the nomogram of the 380 nm visual pigment, this type is therefore referred to as the 380 nm photoreceptor.

The line 203 in FIG. 2 shows the sensitive range of cells with photoreceptors in the 490 nm photoreceptor group. The line 203 has a simple spectral sensitivity peak at 490 nm, and the spectral sensitivity curve is best fitted with the nomogram of the 490 nm visual pigment.

The line 204 of FIG. 2 shows the sensitive range of the cells with photoreceptors in the 510 nm photoreceptor group. The line 204 seems like a "screened" curve of the 490 nm photoreceptor. Therefore, the spectral sensitivity peak was "shifted" to 480~550 nm range, and the curve was best fitted with the nomogram of the 510 nm visual pigment.

The line 205 of FIG. 2 shows the sensitive range of the cells with photoreceptors in the dual-peak photoreceptor group. The line 205 is composed of two major peaks in the UV (330~370 nm) and the blue-green (430~510 nm) range.

Color Preference of the Oriental Fruit Fly

Since the basic knowledge of photoreceptor responsive to different stimuli on the UV range was built up, a color preference behavior test of the oriental fruit fly would be carried. As shown in step 120, a spectrometer (S2000, Ocean Optics Inc.) is employed to measure a spectral reflectance (R(λ)) of the colored papers by compared with a reflectance standard (WS-1, Ocean Optics Inc.). Some applicable colored papers were chosen in accordance with the spectral sensitivity distribution of the photoreceptors of the oriental fruit fly. Six colored papers, yellow, orange, red, green, black and white paper, were chosen to carry out the color preference behavior test of the oriental fruit fly.

Figure 3:
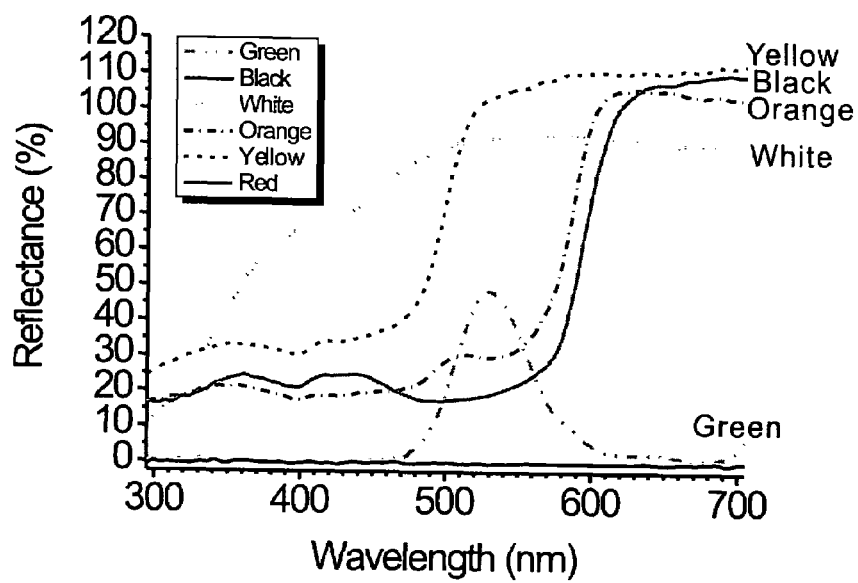
FIG. 3 is a diagram that shows the spectral reflectance (R(λ)) of colored papers.

The spectral reflectance ($R(\lambda)$) results of the colored papers are shown in FIG. 3. The black paper with almost no reflectance was chosen as the test control, and the yellow, orange, and red papers were chosen to test the effect of different stimuli on the sensitivity peaks between 490 nm~560 nm. The green and white papers were chosen to test the effect of strong and zero UV stimulus.

Figure 4:
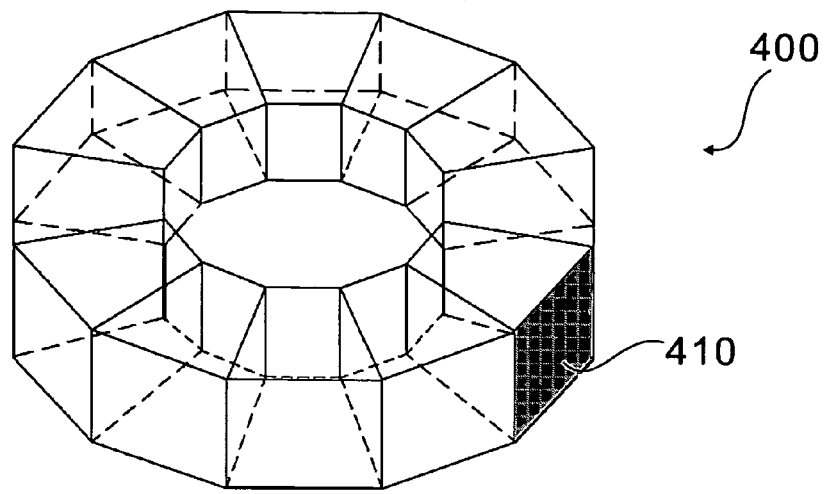
FIG. 4 is an illustration of a container employed to perform the color preference behavior test.

As shown in step 130, the color preference behavior test of the oriental fruit fly was carried out. Reference is made to FIG. 4, which shows an illustration of a testing container employed to perform the color preference behavior test. The testing container is a polyhedral maze, such as a dodecagon maze. In one embodiment, a dodecagon maze 400 was composed of twelve chambers, and twelve different colored papers were attached symmetrically on each wall 410. The six different paper colors attached symmetrically on the twelve walls are further separated with opaque black plastic plating. The dodecagon maze 400 with a transparent top was placed in the shade of trees in order to prevent any possible effects of polarization from incident light.

At least 30 flies were placed at the center of the dodecagon maze 400 for each test, and allowed to move and fly freely to lower any possible stress effect. The flies of different ages and different sexes were tested separately. Both male and female flies from 1~20 days old from eclosion were tested. Then, after 30 minutes, the numbers of flies in each chamber were counted, and the preferred rates were obtained from 3 replicates within each age and sex.

The results obtained from the color preference behavior test of the oriental fruit fly were analyzed by SAS® (ver. 8.2, SAS Institute Inc.) software to interpret the correlation between the colored paper, the age or sex affection of oriental fruit fly, and the choice rates of colored papers made by oriental fruit fly.

The choice rates were not significantly related to either age or sex when analyzed with the 3-way ANOVA test ($P > 0.05$; ANOVA Procedure of SAS®), but significantly related to the color of the papers ($P < 0.05$). Therefore, the data from both sexes and all ages were combined for further analyses, and 120 replicates were obtained from 3 replicates for 20 ages and 2 sexes.

Figure 5:
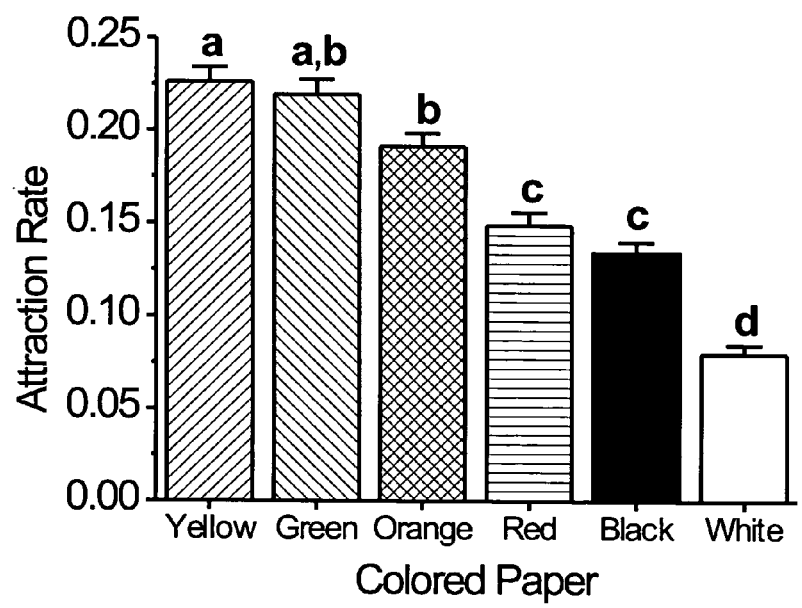
FIG. 5 is a diagram of the choice rate of different colored papers to the oriental fruit fly.

Reference is made to FIG. 5, which shows a diagram of attraction (Mean+S.E.) of different colored papers to the oriental fruit fly. The statistics of attraction were obtained from 12 replicates. The same lowercase letters above the bars in (a, b, c) indicate no significant difference ($P > 0.05$) using ANOVA Procedure and Tukey's Studentized Range (HSD) Test of SAS®.

The mean choice rates for the colored papers of the oriental fruit fly from 120 replicates were shown in FIG. 5. The green, yellow and orange colored papers, with an oriental fruit fly attracting rate of (Mean±S.E.) 0.22652±0.00766, 0.21941±0.00826 and 0.19132±0.00704 respectively, were significantly more attractive to the oriental fruit fly than the red, black or white colored papers. The white paper with the 0.0799±0.00504 oriental fruit fly attracting rate was significantly less attractive to the oriental fruit fly than the red and black colored paper with an attracting rate of 0.14874±0.00707 and 0.13411±0.00578 respectively.

The green colored paper shows the highest attraction among the colored papers having a broader and higher reflectance. It demonstrates that the chromatic stimuli of the spectra between 490~580 nm are crucial cues for attracting the oriental fruit fly. This supposition is also supported by the fact that orange colored paper with a reflectance spectrum slightly higher than that of red colored paper, in the range between 475 nm ~600 nm, has a significantly stronger attraction for the flies than the red colored paper.

In addition, white paper has the broadest reflectance spectrum but the lowest attractiveness to the flies, even less than the black paper, and the green colored paper has a similar attractive effect as the yellow colored paper which has a much higher reflectance, between 490~580 nm, than the green colored paper. Thus a "negative cue" must exist that causes these colored papers to appear less attractive. Since the oriental fruit fly has a sensitive peak in the UV range, and since the yellow and white papers also have a higher reflectance in the UV range than the black and green papers, an inference can be made that the UV stimuli probably provides a negative effect to the color preference.

Statistics of Color Preference Behavior Test

As shown in step 140, for the purpose of analyzing the result of the color preference behavior test, the relative photoreceptor quantum catches calculate the chromatic stimuli of the colored papers received by the oriental fruit fly. Since the absolute sensitivities of the photoreceptors will adapt to background illuminations (Laughlin, 1989), the normalized spectrum of the illumination was used to calculate the relative receptor quantum catches, and the ratios of the absolute sensitivities between each type of photoreceptors were also ignored. Three pieces of information are considered, the relative quantum catches (q) of a photoreceptor type i (i=Dual-peak, 370 nm, 380 nm, 490 nm or 510 nm photoreceptors) were calculated from the normalized spectrum of the illumination ($I(\lambda)$), the reflectance of the colored paper ($S(\lambda)$), and the relative spectral sensitivity of the photoreceptor ($R_i(\lambda)$), as:

$$q_i = \int_{300}^{700} I(\lambda) R_i(\lambda) S_i(\lambda) d\lambda$$

Wherein, the spectral resolution ($d\lambda$) of the measurement was limited to 10 nm, and the calculation ranged between 300 to 700 nm. The relative illumination spectra were also measured by a spectrometer with a cosine corrector (CC-3-UV, Ocean Optics Inc.) during the color preference tests. The relative receptor quantum catches, $q_i$, were used as inputs of the following modeling procedure.

A modeling procedure follows a generalized linear model applied by Kelber (1999) to analyze the relationship between the attractiveness of the colored paper and the preference behavior of the oriental fruit fly. The model consists of two parts, the linear predictor, $\eta$, and the link function, F. In this case, the attractiveness of the colored paper is assumed to be the result of the linear interaction between the receptions of different types of receptor. Therefore, the linear predictor is shown as:

$$\eta = x_D q_D + x_U q_U + x_V q_V + x_G q_G + x_R q_R + c,$$

the qi are the relative receptor quantum catches of each receptors and the c is a constant, wherein the D indicates the dual peak photoreceptor; the U, V, G, and R that indicate the 370, 380, 490, and 510 photoreceptors, respectively.

The choice rate for one colored paper, Cc, is a function of the color attractiveness: $C_c = F(\eta)$, and the link function:

$$F = \frac{1}{1+e^{-\eta}},$$

wherein, the assumed the link function is a sigmoid curve.

The GENMOD procedure of SAS® (ver. 8.2, SAS Institute Inc.) was applied to perform the modeling and all thirty possible combinations of the five types of photoreceptors were tested. Parts of the choice rate data and the relative receptor quantum catches of the photoreceptors were used for modeling, and the remaining data were used to test the models.

Reference is made to FIG. 6, which shows a goodness-of-fit model ($x^2$ Value/DF<2) of thirty possible combinations (models) of the five types of photoreceptors. Nineteen models display the goodness-of-fit model, and the $x_i$ of each model is used to calculate the coefficient of oriental fruit fly preference behavior with different stimuli.

As the above-mentioned, assuming the link function is a sigmoid curve, thus the higher choice rate of the colored paper is determined by the larger linear predictor ($\eta$). Therefore, a colored article with a wavelength that provides a positive coefficient indicated the wavelength raises the choice rate made by the oriental fruit fly. On the other hand, the negative coefficient indicated the choice rate made by the oriental fruit fly is diminished.

Figure 7:
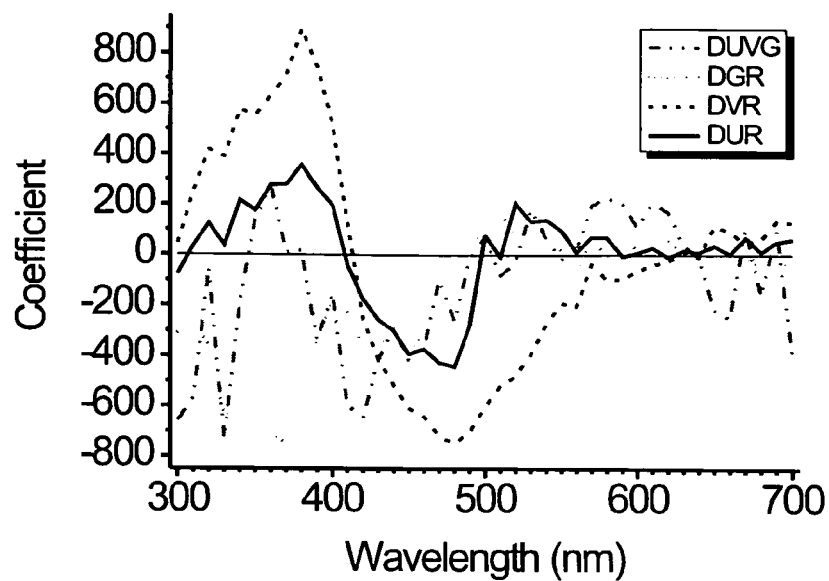
FIG. 7 is a diagram that shows the coefficient of four model groups.

Reference is made to FIG. 7, which shows a diagram of the coefficient of four model groups. The four model groups were grouped from three wavelength ranges divided by positive or negative effects, that is, the UV range (300~400 nm), the blue light range (400~490 nm), and the green light range (490~580 nm).

The four model groups include a group of models with positive effects on the UV and the green light range, and with negative effects on the blue light range, such as DUVGR, DUVR, UVGR, VGR, UGR and DUR models. Another group of models with a positive effect on the green light range, and with a negative effect on the UV and blue light range, such as DGR, DVG, DUG, DG, and GR models. Still another group of models with a positive effect on the green light range, with a negative effect on the blue light range, and with both positive and negative effects on the UV range, such as DUVG, DVGR, UVR, UVG and DUV models. In addition, a model, DVR, demonstrates a positive effect on the UV range, and a negative effect on the green light and the blue light range.

Figure 8:
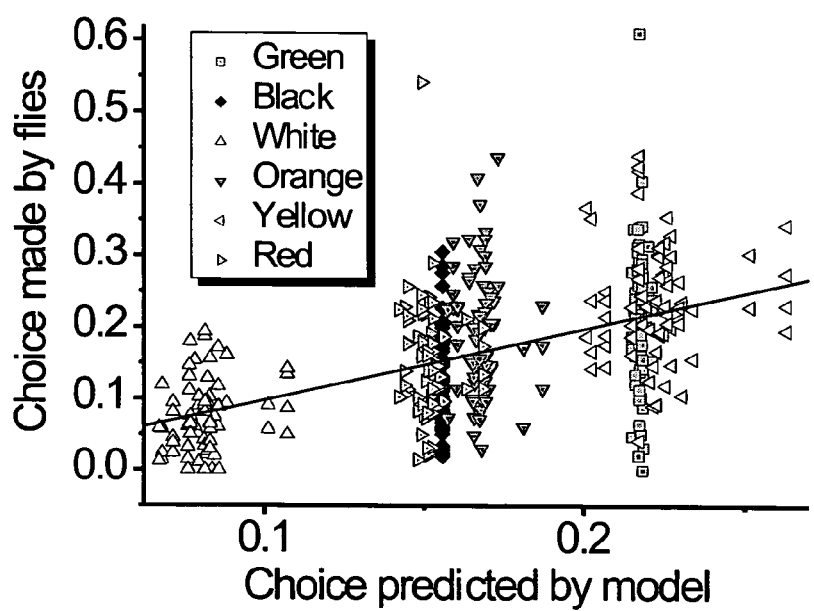
FIG. 8 is a diagram that shows the correlation between the predictions of DUR model and the actual choice rate made by the flies.

Referring back to FIG. 6, although the DUR model merely refers to three types of photoreceptors, it provides the optimum goodness-of-fit. Furthermore, reference is made to FIG. 8; the DUR model was further tested with the choice rate data obtained from the color preference tests but which were not used in the modeling procedure. It seems that the DUR model can be used to correctly predict the actual choice rate made by the flies, as the comparison regression line, y=1.0916x−0.01494, was very close to the expected relation, y=x.

Hence, the model with the positive effect on the UV and the green light range (310~410 nm and 500~580 nm), and with the negative effect on the blue light range (410~500 nm) is adopted to predict the color preference of oriental fruit fly. That is, the highest attraction among the colored papers having a reflectance spectrum in the range between 310~410 nm and 500~580 nm and the colored papers having a reflectance spectrum in the range between 410~500 nm is less attractive to the oriental fruit fly.

Finally, as shown in step 150, the wavelength preference of insects may be predicted by the inference of the previous tests to develop a visual cue trap. According to the embodiments of present invention, the visual cue trap is a colored article, such as colored sticky paper, colored sticky board, colored fruit-mimicking sphere, or an insect-catching lamp that provides the wavelength preferred by the insects. Another embodiment of present invention, the visual cue trap developed in the foregoing step, would cooperate with an olfactory cue to optimize the lure-and-kill trap.

It should be noted that although the embodiments of present invention employ the oriental fruit fly to perform the overall tests, however, any insect that has a color preference behavior can adopt the embodiments of the present invention.

In summary, the embodiment of the present invention provides a method of preventing and controlling insect pests by following steps:

First, the spectral sensitivities of the photoreceptors in the compound eye of insects were measured. The receptor quantum catch theory was applied to study the chromatic cue of fly-attracting, and the spectral types of photoreceptors were grouped by recording and analyzing the peak wavelength.

Next, the reflectance spectrums of colored papers were measured, and then the applicable colored papers were chosen to test the color preference of the insects. On the step subsequent to the elected colored papers, the visual stimulus to each type of photoreceptors of the colored papers was also calculated.

Afterward, a generalized linear model was applied to analyze the data and the model of insect color preference was obtained. Finally, referring to the inference of previous tests, more effective chromatic cue traps were developed to prevent and control the insect pests.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of preventing and controlling insect pests, comprising:
    performing an intracellular spectral sensitivity measurement of photoreceptors in the compound eye of an insect by using an equal quantum flux measurement;
    recording instantaneous data of the equal quantum flux measurement;
    drawing a plurality of spectral sensitivity curves of the photoreceptors;
    grouping a plurality of spectral types of photoreceptors in accordance with a peak wavelength ($\lambda$max) of each one of the spectral sensitivity curve;
    measuring a spectral reflectance ($R(\lambda)$) of colored papers compared with a reflectance standard;
    selecting colored papers with the reflectance spectrum relative to the spectral types of photoreceptors;
    performing a color preference behavior test on the insects in accordance with the colored papers choice rates made by insects;
    analyzing the results of the color preference behavior test of the insects;

performing an equal quantum flux measurement to calculate relative receptor quantum catches from visual stimulus of the photoreceptors that is reflected from the colored papers;

analyzing the correlation between the color preference behavior test and the equal quantum flux measurement by using a regression analysis; and developing a chromatic cue trap by referring to results of the regression analysis.

2. The method of claim 1, wherein the steps of the spectral sensitivity measurement comprising:

inserting a microelectrode to measure a electrophysiological response from stimulated photoreceptors of the compound eye of insects;

amplifying the measured signals by an amplifier;

inputting the amplified signals via a multifunction data acquisition system to a compatible PC and converting it into instantaneous data; and processing the instantaneous data with a software.

3. The method of claim 2, wherein the software is a graphical programming software.

4. The method of claim 1, wherein the steps of the color preference behavior test comprising:

placing a plurality of insects on the center of a polyhedral maze for a period, the polyhedral maze is composed of a plurality of chambers and with various colors of papers attached symmetrically on the walls of the polyhedral maze;

counting the number of insects in each one of the chambers after the period; and performing an analyzing procedure by using a 3-way ANOVA test and a Tukey's Studentized Range (HSD) Test of an integrating system software to interpret the correlation between the colored paper and the choice rates of colored papers.

5. The method of claim 4, wherein the colored papers are separated with opaque black plastic plating.

6. The method of claim 4, wherein the polyhedral maze has a transparent top.

7. The method of claim 4, wherein the polyhedral maze was placed in the shade of trees.

8. The method of claim 4, wherein the insects were tested separately for different ages and sex.

9. The method of claim 4, further comprising the use of black paper as a test control.

10. The method of claim 1, wherein the procedures of the regression analysis comprising:

quantifying the relative receptor quantum catches of a photoreceptor type qi that is calculated from a normalized spectrum of an illumination $I(\lambda)$, a reflectance of the colored paper $S(\lambda)$, and a relative spectral sensitivity of the photoreceptor $Ri(\lambda)$, as:

$$q_i = \int_{300}^{700} I(\lambda) R_i(\lambda) S_i(\lambda) d\lambda; \text{ and}$$

performing a generalized linear modeling procedure.

11. The method of claim 10, wherein the regression analysis is performed by a statistical modeling procedure of an integrating system software.

12. The method of claim 1, wherein the chromatic cue trap comprises a colored article.

13. The method of claim 12, wherein the colored article comprises a colored fruit-mimicking sphere.

14. The method of claim 12, wherein the colored article comprises colored sticky article.

15. The method of claim 1, wherein the chromatic cue trap is an insect-catching lamp.

16. The method of claim 1, wherein the chromatic cue trap cooperates with an olfactory cue.

17. A method of analyzing color preference behavior of insect pests, comprising:

performing a intracellular spectral sensitivity measurement of photoreceptors in the compound eye of an insect by using an equal quantum flux measurement;

recording instantaneous data of the equal quantum flux measurement by using a software;

drawing a spectral sensitivity curve of the photoreceptors;

grouping a plurality of spectral types of photoreceptors in accordance with a peak wavelength ($\lambda$max) of each one of the spectral sensitivity curve;

measuring a spectral reflectance ($R(\lambda)$) of colored papers compared with a reflectance standard;

selecting colored papers with reflectance spectrum relative to the spectral types of photoreceptors;

performing a color preference behavior test on the insects by placing a plurality of the insects on the center of a polyhedral maze for a period and counting the numbers of insects;

quantifying the relative receptor quantum catches of a photoreceptor type qi calculated from a normalized spectrum of the illumination $I(\lambda)$, a reflectance of the colored paper $S(\lambda)$, and a relative spectral sensitivity of the photoreceptor $Ri(\lambda)$, as:

$$q_i = \int_{300}^{700} I(\lambda) R_i(\lambda) S_i(\lambda) d\lambda; \text{ and}$$

performing a generalized linear modeling procedure to analyze the correlation between the color preference behavior test and the equal quantum flux measurement.

18. The method of claim 17, wherein the software is a graphical programming software.

19. The method of claim 17, wherein the polyhedral maze is composed of a plurality of chambers and with the elected colored papers attached symmetrically on the walls of the polyhedral maze.

20. The method of claim 17, wherein the regression analysis is performed by a statistical modeling procedure of an integrating system software.

* * * * *